US010001112B2

(12) United States Patent
Mishima et al.

(10) Patent No.: US 10,001,112 B2
(45) Date of Patent: Jun. 19, 2018

(54) SOLAR/AIR TURBINE GENERATOR SYSTEM

(71) Applicant: Mitsubishi Hitachi Power Systems, Ltd., Nishi-ku, Yokohama (JP)

(72) Inventors: Nobuyoshi Mishima, Yokohama (JP); Toshiyuki Osada, Yokohama (JP); Naoyuki Nagafuchi, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 214 days.

(21) Appl. No.: 14/808,568

(22) Filed: Jul. 24, 2015

(65) Prior Publication Data

US 2016/0032900 A1 Feb. 4, 2016

(30) Foreign Application Priority Data

Jul. 31, 2014 (JP) .................................. 2014-156841

(51) Int. Cl.
*F03G 6/04* (2006.01)
*F02C 1/05* (2006.01)
(Continued)

(52) U.S. Cl.
CPC .................. *F03G 6/04* (2013.01); *F02C 1/05* (2013.01); *F02C 7/10* (2013.01); *F03D 9/007* (2013.01);
(Continued)

(58) Field of Classification Search
CPC .... F02C 1/05; F02C 7/10; F03D 9/007; F03G 6/04; F03G 6/068
See application file for complete search history.

(56) References Cited

U.S. PATENT DOCUMENTS 3,301,000 A  *  1/1967  Holbay ................... F25B 25/02
                                                       62/116
4,167,856 A     9/1979  Seidel et al.
(Continued)

FOREIGN PATENT DOCUMENTS

CN          201916139 U      8/2011
CN          103477053 A     12/2013
(Continued)

OTHER PUBLICATIONS

European Search Report issued in counterpart European Application No. 15179074.8 dated Jan. 8, 2016 (seven pages).
(Continued)

*Primary Examiner* — Laert Dounis
*Assistant Examiner* — Matthew T Largi
(74) *Attorney, Agent, or Firm* — Crowell & Moring LLP (57) ABSTRACT

The invention provides a solar/air turbine generator system that reduces construction and power generating costs and does not require the use of fossil fuel.
A solar/air turbine generator system comprises: a compressor for drawing in and compressing air; a solar receiver for heating the air compressed by the compressor with the use of solar heat collected by a solar collector; an air turbine for driving the compressor and a generator by receiving the compressed air heated by the solar receiver; a regenerative heat exchanger, located between the compressor and the solar receiver, for heating the air compressed by the compressor using the exhaust of the air turbine as a heating medium; and a distribution device, located between the compressor and the regenerative heat exchanger, for distributing the compressed air to the side of the regenerative heat exchanger and to a bypass side, the bypass side being the inlet side of the air turbine. The solar/air turbine generator system further includes a control device for maintaining the
(Continued)

air temperature at the inlet of the air turbine at a constant value by adjusting the flow rate of the air turbine exhaust that flows into the regenerative heat exchanger as a heating medium.

6 Claims, 3 Drawing Sheets (51) Int. Cl.
  *F02C 7/10* (2006.01)
  *F03D 9/00* (2016.01)
  *F03G 6/06* (2006.01)
(52) U.S. Cl.
  CPC ........ *F03G 6/068* (2013.01); *F05B 2270/303* (2013.01); *Y02E 10/46* (2013.01); *Y02E 10/465* (2013.01)

(56) References Cited

U.S. PATENT DOCUMENTS

| | | | |
|---|---|---|---|
| 4,262,484 A * | 4/1981 | Jubb | F02C 1/05 126/641 |
| 4,942,736 A | 7/1990 | Bronicki | |
| 6,349,551 B1 * | 2/2002 | Jirnov | F25B 9/006 62/467 |
| 8,015,812 B1 | 9/2011 | Kesseli et al. | |
| 2004/0068989 A1 * | 4/2004 | Wantanabe | F02G 5/02 60/670 |
| 2011/0185742 A1 | 8/2011 | Heide et al. | |
| 2011/0252797 A1 | 10/2011 | Kobayashi et al. | |
| 2014/0298807 A1 | 10/2014 | Villarrubia Ruiz | |

FOREIGN PATENT DOCUMENTS

| | | |
|---|---|---|
| GB | 2 006 878 A | 5/1979 |
| JP | 2010-275996 A | 12/2010 |
| JP | 2010-275997 A | 12/2010 |
| JP | 2011-7149 A | 1/2011 |

OTHER PUBLICATIONS

Chinese Office Action issued in counterpart Chinese Application No. 201510450868.6 dated Sep. 2, 2016 (twenty (20) pages).

* cited by examiner

FIG. 3A (a) AMBIENT TEMPERATURE
(b) TURBINE INLET TEMPERATURE
(c) SUNLIGHT INTENSITY

FIG. 3B (d) COOLANT BYPASS FLOW RATE
(e) REGENERATIVE HEAT EXCHANGER BYPASS AIRFLOW RATE

FIG. 3C (f) GENERATOR OUTPUT
(g) SOLAR COLLECTOR AIRFLOW RATE
(h) SOLAR COLLECTOR BYPASS AIRFLOW RATE

SOLAR/AIR TURBINE GENERATOR SYSTEM

BACKGROUND OF THE INVENTION

1. Field of the Invention

The present invention relates to a solar/air turbine generator system.

2. Description of the Related Art

JP-2011-7149-A discloses a solar generator system comprising: a compressor for compressing air to generate a compressed fluid; a solar receiver for heating the compressed fluid by solar heat to produce a high-temperature compressed fluid; a gas turbine for receiving the high-temperature compressed fluid to obtain output; and a generator connected to the gas turbine.

The solar receiver of the above system is installed atop a tower together with a solar gas turbine for the purpose of minimizing the lengths of high-temperature pipes. For this reason, the tower requires high construction costs. JP-2010-275997-A, on the other hand, discloses a solar gas turbine and solar/gas turbine generator system in which the compressor and turbine are positioned away from each other so that a smaller load is placed on the tower, thereby reducing its construction costs.

SUMMARY OF THE INVENTION

In the solar generator system of JP-2011-7149-A, when sufficient sunlight is not obtained, an auxiliary combustor, located between the solar receiver and the turbine, is used to combust fossil fuel, thereby heating the compressed fluid fed to the turbine up to a particular temperature. This means that fossil fuel supply equipment is necessary for the auxiliary combustor, which in turn increases construction costs as well as power generating costs due to the consumption of the fossil fuel.

In the solar/gas turbine generator system of JP-2010-275997-A, the compressor 1 and the compressor drive motor 7 are installed on the ground, and the solar receiver 2, the turbine 3, the generator 4, and the repeater 5 are all installed on top of the solar collecting tower T. Thus, the load placed on the tower T is smaller than in JP-2011-7149-A. However, since the turbine 3 and the generator 4 are installed on the tower T, the operation of the turbine 3 may become unstable. There are also problems with increased costs of constructing the base of the tower T and with vibration at the time of operation. Moreover, because the force of the compressor 1 is not directly supplied from the turbine shaft, the large electric motor 7 is necessary to drive the compressor 1, leading to an increase in equipment costs.

The present invention has been made in view of the above, and an object of the invention is to provide a solar/air turbine generator system that reduces construction and power generating costs and does not require the use of fossil fuel.

This application offers several means to solve the problems, and one of them is a solar/air turbine generator system comprising: a compressor for drawing in and compressing air; a solar receiver for heating the air compressed by the compressor with the use of solar heat collected by a solar collector; an air turbine for driving the compressor and a generator by receiving the compressed air heated by the solar receiver; a regenerative heat exchanger, located downstream of the compressor and upstream of the solar receiver, for heating the air compressed by the compressor using the exhaust of the air turbine as a heating medium; and a distribution device, located downstream of the compressor and upstream of the regenerative heat exchanger, for distributing the air compressed by the compressor to the side of the regenerative heat exchanger and to a bypass side, the bypass side being the inlet side of the air turbine. The solar/air turbine generator system further includes a control device for maintaining the air temperature at the inlet of the air turbine at a constant value by adjusting the flow rate of the air turbine exhaust that flows into the regenerative heat exchanger as a heating medium.

The invention provides a solar/air turbine generator system that reduces construction and power generating costs and does not require the use of fossil fuel.

DESCRIPTION OF THE PREFERRED EMBODIMENTS

A solar/air turbine generator system according to an embodiment of the invention will now be described.

All the main components constituting the solar/air turbine generator system are installed on the ground except a solar collector (solar receiver), which is installed on top of a tower.

The system comprises the following components toward the solar receiver installed atop the tower: many reflective mirrors for reflecting sunlight onto the solar receiver; a compressor; a solar/air turbine generator in which an air turbine and a generator are connected; a cooler for cooing the air drawn in by the compressor; a regenerative heat exchanger for further heating the air at the outlet of the compressor; an inverter for using the solar/air turbine generator as an electric motor at the time of startup. With the use of the electric power extracted from the solar/air turbine generator, electricity can be generated cost-effectively and stably from solar heat, regardless of weather changes in a day and without discharging any harmful combustion gas of fossil fuel.

Part of the power generated by the solar/air turbine generator is extracted from an in-plant electric system, and a coolant chiller (e.g., centrifugal chiller) is driven to generate cooling water. By this cooling water flowing into the air cooler, the air drawn in by the compressor is cooled.

The compressor outlet air is distributed according to weather conditions, with the use of a three-way air distributing device for distributing the medium-pressure, medium temperature air at the outlet of the compressor to the solar receiver side and to the solar receiver bypass side. The air distribution is controlled on the basis of the time that has passed since sunrise and the weather on that day. In addition, a three-way coolant flowrate adjusting valve is used to control the coolant flow rate to the air cooler in response to the ambient temperature and sunlight intensity changing with weather changes, thereby controlling decreases in the air temperature at the inlet of the compressor. By doing so, the temperature of the high-temperature air at the inlet of the air turbine is indirectly maintained at a constant value.

The regenerative heat exchanger is provided at the outlet of the compressor in order to further heat the medium-temperature air at the outlet of the compressor to obtain high-temperature air. The medium-temperature air at the outlet of the compressor is heated by the exhaust air of the air turbine.

The exhaust air of the air turbine is directed to a regenerative heat exchanger inflow system and to a regenerative heat exchanger bypass system. The bypass air flow rate is controlled by a three-way bypass air flow rate adjusting valve provided in the regenerative heat exchanger bypass system. This allows the air turbine inlet temperature to be indirectly maintained at a constant value without being influenced by weather changes, thereby achieving the electric output and safe operation of the air turbine.

Before the solar heat or the amount of heat collected exceeds a maximum permissible amount, or when the air turbine inlet temperature exceeds a given value, a solar collection rate controller is activated to change the reflection angle of a solar reflection apparatus to direct the sunlight away from the solar receiver. By doing so, the amount of solar heat collected is reduced, the air turbine inlet temperature is maintained at a constant value, and the output of the air turbine is prevented from exceeding its maximum permissible output amount.

Further description is given below with reference to the accompanying drawings.

Figure 1:
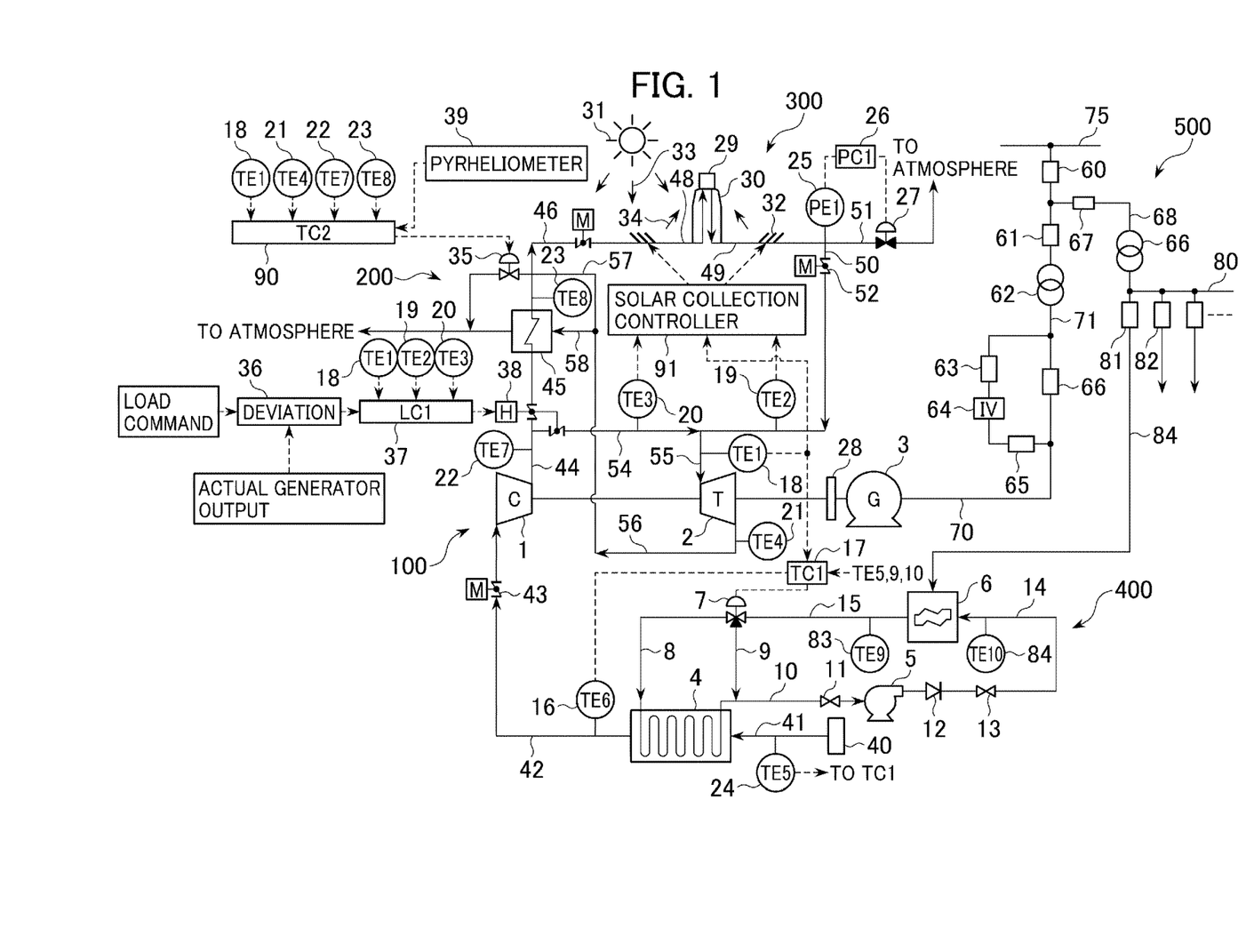
FIG. 1 illustrates the structure of a solar/air turbine generator system according to an embodiment of the invention.

FIG. 1 illustrates the structure of a solar/air turbine generator system according to an embodiment of the invention. As illustrated in FIG. 1, the solar/air turbine generator system includes a gas turbine generator/compressor apparatus 100, an air turbine inlet temperature controller 200, a solar collector 300, a centrifugal chiller apparatus 400, and an in-plant electric system 500.

The gas turbine generator/compressor apparatus 100 includes the following components: a compressor 1 for compressing the air supplied from the centrifugal chiller apparatus 400; an air turbine 2 driven by the high-temperature air supplied from the solar collector 300; and a generator 3 that generates electric power when driven by the air turbine 2 and functions as a motor when receiving electric power from the in-plant electric system 500 through an inverter 64. The compressor 1 and the air turbine 2 are connected by a common rotary shaft. The air turbine 2 and the generator 3 are also connected by rotary shafts, but they can be selectively connected or disconnected by a shaft connector 28. The shaft connector 28 can be a clutch or a torque converter, for example. In the present embodiment, an SSS clutch is used as the shaft connector 28.

The air turbine inlet temperature controller 200 includes the following components: a compressor outlet pipe 44, one end of which is connected to the outlet of the compressor 1; a regenerative heat exchanger 45 to which the other end of the compressor outlet pipe 44 is connected and that raises the temperature of the compressed air supplied from the compressor 1; a regenerative heat exchanger outlet pipe 46 for directing the compressed air heated by the regenerative heat exchanger 45 to the solar collector 300; an air turbine outlet pipe 56, one end of which is connected to the outlet of the air turbine 2; a regenerative heat exchanger bypass pipe 57, connected to one of the branch sections located at the other end of the air turbine outlet pipe 56, for discharging exhaust into the atmosphere by bypassing the regenerative heat exchanger 45; an air turbine outlet side regenerative heat exchanger inlet pipe 58, connected to the other branch section of the air turbine outlet pipe 56, for directing exhaust to the regenerative heat exchanger 45 as a heating medium; and a regenerative heat exchanger bypass valve 35, located in the regenerative heat exchanger bypass pipe 57, for adjusting the flow rate of the exhaust that bypasses the regenerative heat exchanger 45.

A temperature sensor 22 is provided in the compressor outlet pipe 44 to detect the air temperature at the outlet of the compressor 1. Likewise, a temperature sensor 23 is provided in the regenerative heat exchanger outlet pipe 46 to detect the air temperature at the outlet of the regenerative heat exchanger 45, and a temperature sensor 21 is provided in the air turbine outlet pipe 56 to detect the air temperature at the outlet of the air turbine 2. Temperature signals obtained by these sensors 21 to 23 are input to a regenerative heat exchanger outlet air temperature controller 90, described later.

The air turbine inlet temperature controller 200 includes the following components: a three-way air distributing butterfly valve 38 for distributing compressed air to the regenerative heat exchanger 45 and to the air turbine 2 (bypass side); an air turbine inlet high-temperature air pipe 55, one end of which is connected to the inlet of the air turbine 2; and a solar collector bypass butterfly valve outlet pipe 54, one end of which is connected to the other end of the air turbine inlet high-temperature air pipe 55 and the other end of which is connected to the compressor outlet pipe 44 via the three-way air distributing butterfly valve 38.

A temperature sensor 18 is provided in the air turbine inlet high-temperature air pipe 55 to detect the air temperature at the inlet of the air turbine 2. Likewise, a temperature sensor 20 is provided in the solar collector bypass butterfly valve outlet pipe 54 to detect the solar collector bypass air temperature. A temperature signal obtained by the temperature sensor 20 is input to a compressed air distribution controller 37 and a solar collection controller 91 while a temperature signal obtained by the temperature sensor 18 is input to the compressed air distribution controller 37, the regenerative heat exchanger outlet air temperature controller 90, the solar collection controller 91, and an air cooler outlet air temperature controller 17.

The air turbine inlet temperature controller 200 also includes the compressed air distribution controller 37 that adjusts the distribution amount of the compressed air from the compressor 1 to the solar collector side and to the bypass side by controlling the three-way air distributing butterfly valve 38. The air turbine inlet temperature controller 200 further includes the regenerative heat exchanger outlet air temperature controller 90 that adjusts the inlet air temperature of the air turbine 2 to a constant value by controlling the opening degree of the regenerative heat exchanger bypass valve 35.

The solar collector 300 includes the following components: a solar collector inlet butterfly valve 47 provided in a regenerative heat exchanger outlet pipe 46; a solar receiver 29 installed atop a tower 30; a tower inlet air pipe 48, one end of which is connected to the outlet of the solar collector inlet butterfly valve 47 and the other end of which is connected to the inlet of the solar receiver 29; a solar reflector 32 for reflecting the sunlight 33 emitted from the sun 31 using reflective mirrors and concentrating the resultant reflected light 34 onto the solar receiver 29 to increase air temperature; and a pyrheliometer 39 for measuring the intensity of the sunlight.

The solar collector 300 also includes the following components: a tower outlet air pipe 49, one end of which is connected to the outlet of the solar receiver 29; a tower outlet air turbine side air pipe 50, one end of which is connected to one of the branch sections on the other side of the tower outlet air pipe 49 and the other end of which is connected to the solar collector bypass butterfly valve outlet pipe 54; a solar collector outlet butterfly valve 52 provided in the tower outlet air turbine side air pipe 50; a high pressure tower outlet air pressure relief pipe 51 connected to the other branch section on the other side of the tower outlet air pipe 49 to discharge abnormally pressurized air into the atmosphere; and an air pressure relief adjustment valve 27, provided in the high pressure tower outlet air pressure relief pipe 51, for releasing pressure when the air inside the pipe increases abnormally. A sunlight signal obtained by the pyrheliometer 39 is input to the regenerative heat exchanger outlet air temperature controller 90.

Installed within the tower outlet air turbine side air pipe 50 are a temperature sensor 19 for detecting the air temperature at the outlet of the solar collector and a pressure sensor 25 for detecting the air pressure within the pipe. A solar collector outlet air pressure signal obtained by the pressure sensor 25 is input to an air pressure relief controller 26, described later. A temperature signal obtained by the temperature sensor 19 is input to the compressed air distribution controller 37 and the solar collection controller 91, described later.

The solar collector 300 further includes: the solar collection controller 91 for controlling the reflection angle of the solar reflector 32 to adjust the amount of fuel supplied to the air turbine 2; and the air pressure relief controller 26 for controlling the air pressure relief adjustment valve 27 when the air inside the tower outlet air turbine side air pipe 50 increases abnormally.

The centrifugal chiller apparatus 400 includes the following components: an air cooler 4 having a cooling coil in which a coolant flows and a wind tunnel; an air cooler inlet wind tunnel 41, one end of which is connected to the air inlet of the air cooler 4 and the other end of which leads to an air inlet 40; an air cooler outlet wind tunnel 42, one end of which is connected to the air outlet of the air cooler 4 and the other end of which is connected to the outlet of the compressor 1; and a compressor inlet butterfly valve 43, provided in the air cooler outlet wind tunnel 42, that is half-opened for throttled compressor operation when the compressor 1 is started up and is opened completely when the rated rotational speed is reached.

A temperature sensor 24 is provided in the air cooler inlet wind tunnel 41 to detect the air temperature at the inlet of the air cooler while a temperature sensor 16 is provided in the air cooler outlet wind tunnel 42 to detect the air temperature at the outlet of the air cooler. Temperature signals obtained by these sensors 24 and 16 are input to the air cooler outlet air temperature controller 17, described later.

The centrifugal chiller apparatus 400 also includes: a coolant return pipe 10, one end of which is connected to the coolant outlet of the cooling coil of the air cooler 4; a coolant circulating pump inlet valve 11 provided in the coolant return pipe 10; a coolant circulating pump 5 to which the other end of the coolant return pipe 10 is connected to circulate coolant; a centrifugal chiller return coolant pipe 14, one end of which is connected to the outlet of the coolant circulating pump 5 and along which a check valve 12 and an outlet valve 13 are provided; a centrifugal chiller 6 to which the other end of the centrifugal chiller return coolant pipe 14 is connected to cool the coolant; and a centrifugal chiller outlet coolant pipe 15, one end of which is connected to the outlet of the centrifugal chiller 6. A temperature sensor 84 is provided in the centrifugal chiller return coolant pipe 14 to detect the coolant temperature at the inlet of the centrifugal chiller while a temperature sensor 83 is provided in the centrifugal chiller outlet coolant pipe 15 to detect the coolant temperature at the outlet of the centrifugal chiller. Temperature signals obtained by these sensors 84 and 83 are input to the air cooler outlet air temperature controller 17, described later.

The centrifugal chiller apparatus 400 further includes: a three-way coolant flow adjusting valve 7 the inlet of which is connected to the other end of the centrifugal chiller outlet coolant pipe 15; a coolant supply pipe 8, one end of which is connected to one of the outlets of the three-way coolant flow adjusting valve 7 and the other end of which is connected to the coolant inlet of the cooling coil of the air cooler 4; and a coolant bypass pipe 9, one end of which is connected to another outlet of the three-way coolant flow adjusting valve 7 and the other end of which is connected to the other end of the coolant return pipe 10.

The centrifugal chiller apparatus 400 still further includes the air cooler outlet air temperature controller 17 that controls the opening degree of the three-way coolant flow adjusting valve 7 so that the air temperature at the outlet of the air cooler 4 is maintained at a given temperature.

The in-plant electric system 500 includes the following components: a generator outlet main circuit 70, one end of which is connected to the output end of the generator 3; an inverter bypass circuit breaker 66 to which the other end of the generator outlet main circuit 70 is connected; an inverter outlet circuit breaker 65 to which the other end of the generator outlet main circuit 70 is connected; an inverter 64, located upstream of the inverter outlet circuit breaker 65, for converting the electric power from the electric system into variable frequency power to cause the generator 3 to function as a drive motor for the air turbine 2; an inverter inlet circuit breaker 63, located upstream of the inverter 64, for connecting/disconnecting the electric system to/from the inverter 64; an inverter bypass circuit breaker 66 bypassing the inverter 64 to connect the electric system and the generator 3 at the time of normal operation; a main transformer low voltage side circuit 71, one end of which is connected to the upstream side of the inverter inlet circuit breaker 63 and the upstream side of the inverter bypass circuit breaker 66 and the other end of which is connected to the low voltage side of a main transformer 62; the main transformer 62 for increasing the output voltage of the generator 3 up to the voltage of the electric system; a main circuit breaker 61, located on the high voltage side of the main transformer 62, for connecting or disconnecting the generator 3 to/from an external system 75; and a system circuit breaker 60, located upstream of the main circuit breaker 61, for connecting or disconnecting the main circuit breaker 61 to/from the external system 75.

The in-plant electric system 500 also includes: an in-plant transformer circuit breaker 67, connected to the circuit between the system circuit breaker 60 and the main circuit breaker 61, for connecting or disconnecting an in-plant power supply to/from the external system 75; an in-plant transformer high voltage side circuit 68, one end of which is connected to the downstream side of the in-plant transformer circuit breaker 67 and the other end of which is connected to the high voltage side of an in-plant transformer 69; the in-plant transformer 69 for decreasing the system voltage to the voltage of the in-plant power supply; an in-plant auxiliary circuit 80 connected to the low voltage side of the in-plant transformer 69; and a centrifugal chiller circuit breaker 81 for connecting or disconnecting the in-plant auxiliary circuit 80 to/from the centrifugal chiller 6 of the centrifugal chiller apparatus 400.

Next described with reference to FIG. 1 are the flow and behavior of each heat medium in the solar/air turbine generator system.

In the centrifugal chiller apparatus 400, the air drawn in from the air inlet 40 passes through the air cooler inlet wind tunnel 41 to reach the air cooler 4, where it is cooled by the coolant flowing through the cooling coil. The temperature sensor 24 detects the air cooler inlet air temperature, and the temperature sensor 16 detects the air cooler outlet air temperature, or the temperature of the cooled air.

The centrifugal chiller 6 receives the electric power of the in-plant auxiliary circuit 80, which is voltage-reduced by the in-plant transformer 69, from the external system 75 through the centrifugal chiller circuit breaker 81. The centrifugal chiller 6 also receives the warmed coolant discharged from the coolant return pipe 10 of the air cooler 4 by the coolant circulating pump 5. The centrifugal chiller 6 cools this coolant with the use of the electric energy and directs it to the three-way coolant flow adjusting valve 7 through the centrifugal chiller outlet coolant pipe 15. The three-way coolant flow adjusting valve 7 distributes the coolant to the coolant supply pipe 8 and to the coolant bypass pipe 9 to control the flow rate of the coolant entering the air cooler 4 and the flow rate of the bypassing coolant, thereby controlling the air cooler outlet air temperature detected by the temperature sensor 16.

The air cooler outlet air temperature controller 17 reads the air cooler inlet air temperature signal obtained by the temperature sensor 24, the air turbine inlet air temperature signal obtained by the temperature sensor 18, the air cooler outlet air temperature signal obtained by the temperature sensor 16, the centrifugal chiller outlet coolant temperature signal obtained by the temperature sensor 83, and the centrifugal chiller inlet coolant temperature signal obtained by the temperature sensor 84 to calculate a control signal which allows the inlet air temperature of the air turbine 2 to be kept at a constant value regardless of change in ambient temperature. By this control signal being input to the three-way coolant flow adjusting valve 7, distribution control is performed on the flow rate of the coolant.

The air cooled by the air cooler 4 of the centrifugal chiller apparatus 400 is fed to the compressor 1 through the air cooler outlet wind tunnel 42 and the compressor inlet butterfly valve 43. When the compressor 1 is started up, the compressor inlet butterfly valve 43 is half-opened to reduce the compressor inlet pressure. This is done by a controller, not illustrated, detecting the inlet pressure and the outlet pressure of the compressor 1 and such that the pressure ratio of the inlet pressure to the outlet pressure does not touch the surge line of the compressor 1. Once the rotational speed of the compressor 1 reaches the rated rotational speed, the compressor inlet butterfly valve 43 is opened completely.

In the air turbine inlet temperature controller 200, the cooling air discharged from the compressor inlet butterfly valve 43 enters the compressor 1, where it is compressed to become medium-pressure, medium-temperature air. The air then flows through the compressor outlet pipe 44. With the three-way air distributing butterfly valve 38, most of the air flows into the regenerative heat exchanger 45, and part of it flows into the solar collector bypass butterfly valve outlet pipe 54.

The medium-pressure, medium-temperature air flowing into the regenerative heat exchanger 45 is subjected to heat exchange with the low-pressure, high-temperature air (heating medium) discharged from the air turbine 2 and thus heated. The compressed air heated at the regenerative heat exchanger 45 is fed to the solar collector 300 through the regenerative heat exchanger outlet pipe 46.

The low-pressure, high-temperature air discharged from the air turbine 2 flows into the air turbine outlet side regenerative heat exchanger inlet pipe 58 and the regenerative heat exchanger bypass pipe 57 through the air turbine outlet pipe 56. The low-pressure, high-temperature air flowing into the air turbine outlet side regenerative heat exchanger inlet pipe 58 flows into the regenerative heat exchanger 45, is subjected to heat exchange with the compressed air, and eventually discharged into the atmosphere. On the other hand, the low-pressure, high-temperature air flowing into the regenerative heat exchanger bypass pipe 57 is directly discharged into the atmosphere. The discharge amount of the latter is determined by the opening degree of the regenerative heat exchanger bypass valve 35.

The regenerative heat exchanger outlet air temperature controller 90, which controls the opening degree of the regenerative heat exchanger bypass valve 35, reads the sunlight signal obtained by the pyrheliometer 39, the air turbine inlet air temperature signal obtained by the temperature sensor 18, the air turbine outlet air temperature signal obtained by the temperature sensor 21, the compressor outlet air temperature signal obtained by the temperature sensor 22, and the regenerative heat exchanger outlet air temperature signal obtained by the temperature sensor 23 to calculate an opening-degree control signal for the regenerative heat exchanger bypass valve 35, which allows the air turbine inlet air temperature to be kept at a constant value even when the sunlight signal changes. By using the calculated control signal to control the regenerative heat exchanger bypass valve 35, the air turbine inlet air temperature is maintained at a constant value even if the sunlight signal changes abruptly.

In the solar collector 300, the air heated at the regenerative heat exchanger 45 flows through the regenerative heat exchanger outlet pipe 46 and the solar collector inlet butterfly valve 47. The air is then directed through the tower inlet air pipe 48 to the solar receiver 29 installed atop the tower 30. The reflective mirrors of the solar reflector 32 reflect the sunlight 33 emitted from the sun 31, and the reflected sunlight 34 is concentrated on the solar receiver 29. Thus, temperature of the heating air of the solar receiver 29 further increases.

The solar collection controller 91, which controls the reflection angle of the solar reflector 32, reads the air turbine inlet air temperature signal obtained by the temperature sensor 18, the solar collector outlet air temperature signal obtained by the temperature sensor 19, and the solar collector bypass air temperature signal obtained by the temperature sensor 20 to compute a control signal for increasing or decreasing the heat amount input to the air turbine 2. When the temperature of the solar heat collected or the ambient temperature approaches a maximum permissible amount, or when the air turbine inlet air temperature exceeds a particular value, the reflected light 34 is directed away from the solar receiver 29 to reduce the amount of solar heat collected.

The medium-pressure, high-temperature air heated at the solar receiver 29 flows into the tower outlet air turbine side air pipe 50 and the high pressure tower outlet air pressure relief pipe 51 through the tower outlet air pipe 49.

The air pressure relief adjustment valve 27 is installed in the high pressure tower outlet air pressure relief pipe 51 to discharge the air inside the pipe into the atmosphere when it increases abnormally. The air pressure relief controller 26, which controls the air pressure relief adjustment valve 27, outputs a pressure relief command to the air pressure relief adjustment valve 27 when the solar collector outlet air temperature signal obtained by the pressure sensor 25 exceeds a permissible value. Thus, air that has been pressurized abnormally is discharged into the atmosphere.

The medium-pressure, high-temperature air flowing into the tower outlet air turbine side air pipe 50 converges with the medium-pressure, medium-temperature air flowing from the solar collector bypass butterfly valve outlet pipe 54 through the solar collector outlet butterfly valve 52 and flows into the air turbine 2 via the air turbine inlet high-temperature air pipe 55. As a result, the air turbine 2 generates a force enough to drive the compressor 1 and the generator 3.

The compressed air distribution controller 37, which controls the three-way air distributing butterfly valve 38 of the air turbine inlet temperature controller 200, receives a deviation signal from a deviation calculator 36 that compares the power output of the generator 3 against a load command from the electric system (load dispatching center) to compute the deviation. The compressed air distribution controller 37 reads this deviation signal, the air turbine inlet air temperature signal obtained by the temperature sensor 18, the solar collector outlet air temperature signal obtained by the temperature sensor 19, and the solar collector bypass air temperature signal obtained by the temperature sensor 20 to calculate the distribution amount of the outlet air of the compressor 1 to the solar collector side and the bypass side for the purpose of increasing or decreasing the heat amount input to the air turbine 2. To achieve the calculated distribution amount, a control signal is output to the three-way air distributing butterfly valve 38.

For instance, when the load command is larger than the generator's output, the distribution amount is increased on the solar collector side and decreased on the bypass side. Conversely, when the generator's output is larger than the load command (e.g., at the time of a load decrease), the distribution amount is decreased on the solar collector side and increased on the bypass side. With such control, the generator's output changes stably in response to the system load command, whereby efficient power generation can be achieved.

The solar collector inlet butterfly valve 47 and solar collector outlet butterfly valve 52 of the solar collector 300 are completely closed when solar power generation cannot be performed (e.g., at night). With this, the medium-pressure, medium- or high-temperature air generated in the daytime is sealed (hot banking) within the tower inlet air pipe 48, the tower outlet air pipe 49, and the tower outlet air turbine side air pipe 50. At the time of startup the next day, the solar collector outlet butterfly valve 52 is opened to direct the medium-pressure, medium- or high-temperature air sealed to the air turbine 2, and a warm-up operation is performed to rotate the air turbine 2 at a low speed and to remove moisture from the medium-pressure, high-temperature air pipes. During the warm-up operation, the shaft connector 28 is placed in the disconnecting position so as not to rotate the generator 3.

Figure 2A:
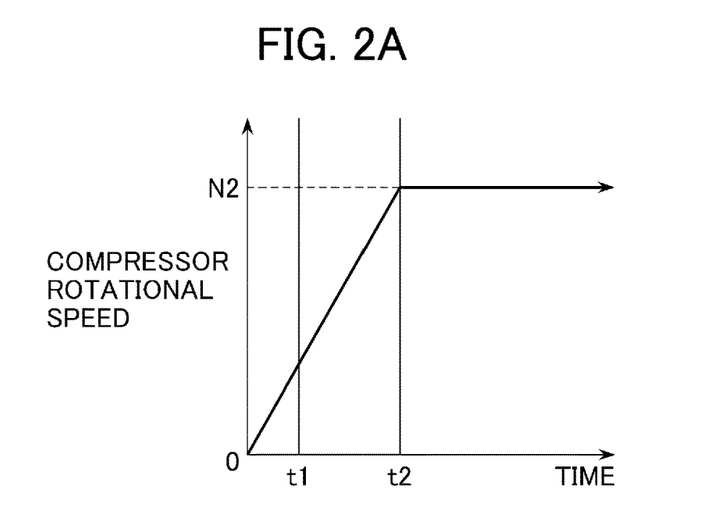
FIG. 2A is a graph illustrating the startup of the compressor of the solar/air turbine generator system.
Figure 2B:
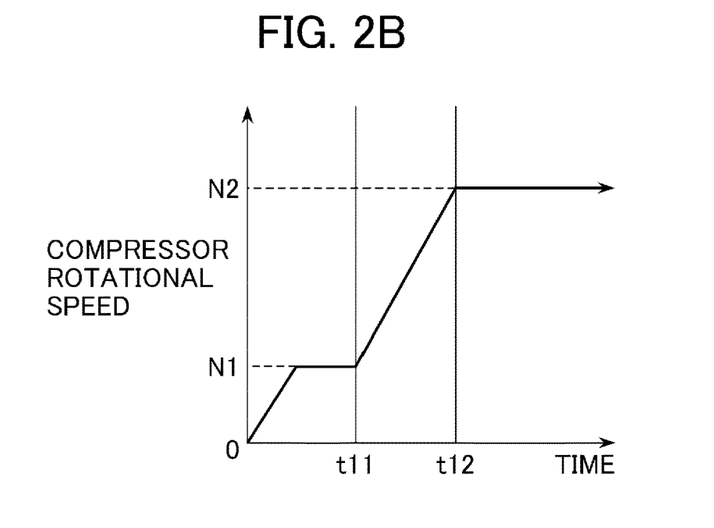
FIG. 2B is a graph illustrating the startup of the compressor constituting a conventional gas turbine.

Next described with reference to FIGS. 2A and 2B is how to start up the compressor of a solar/air turbine generator system according to an embodiment of the invention. FIG. 2A is a graph illustrating the startup of the compressor of the invention while FIG. 2B is a graph illustrating the startup of the compressor constituting a conventional gas turbine.

In FIGS. 2A and 2B, the horizontal axis represents time and the vertical axis compressor rotational speed. Generally, a large force is required to increase the rotational speed of a compressor up to its rated rotational speed (normally a few thousands). Thus, compressor startup methods vary depending on the method to obtain that force.

In the case of the compressor of FIG. 2B, a startup electric motor is attached to the gas turbine compressor shaft, and the rotational speed of the compressor is first increased up to N1 (about 20% of the rated rotational speed). The rotational speed is then increased to N2 (100% of the rated rotational speed; a few thousands). In this case, the force required is large.

In a general gas turbine, a startup electric motor is used to rotate the compressor at about 20% of the rated speed for several minutes to perform a fuel purge at the time of gas turbine startup. Fossil fuel is then burnt by the combustor or an auxiliary combustor to produce a high-temperature gas, and the rotational speed of the compressor is increased up to 100% of the rated rotational speed with the use of the high-temperature gas and the startup electric motor (the operation of the startup electric motor is usually stopped at about 70% of the rated speed). In FIG. 2B, time t11 represents the time at which the compressor rotational speed starts to be increased by the startup electric motor and the high-temperature gas, and time t12 represents the time at which 100% of the rated rotational speed is reached. Thus, during the time period between the startup and time t11, the compressor is rotated only by the startup electric motor, and during the time period between t11 and time t12, the compressor is rotated by the high-temperature gas and the startup electric motor.

In the present embodiment, by contrast, the compressor 1 is started up by opening the solar collector outlet butterfly valve 52 to direct the medium-pressure, high-temperature air sealed into the air turbine 2, as illustrated in FIG. 2A. At time t1, then, the system power is subjected to frequency conversion at the inverter 64, and that power is fed to the generator 3. By using the generator 3 as an electric motor, the rotational speed of the compressor 1 is increased up to the rated speed N2. In FIG. 2A as well, time t2 represents the time at which 100% of the rated rotational speed is reached.

Referring back to FIG. 1, the startup of the compressor 1 is further described.

During the night before the day of the startup, the solar collector inlet butterfly valve 47 and the solar collector outlet butterfly valve 52 in the solar collector 300 are completely closed, and the medium-pressure, medium- or high-temperature air generated is sealed. In the in-plant electric system 500, the in-plant auxiliary circuit 80 is charged via the in-plant transformer 69 with the system circuit breaker 60 and the in-plant transformer circuit breaker 67 turned on. The main circuit breaker 61, the inverter inlet circuit breaker 63, the inverter outlet circuit breaker 65, and the inverter bypass circuit breaker 66 are all disconnected.

At the time of startup, the solar collector outlet butterfly valve 52 is first opened to direct the medium-pressure, medium- or high-temperature air sealed into the air turbine 2, thereby rotating it at a low speed. In this case, the shaft connector 28 is placed in the disconnecting position so as not to rotate the generator 3.

Then in the in-plant electric system 500, the main circuit breaker 61 and the inverter inlet circuit breaker 63 are turned on to supply electric power from the electric system to the inverter 64, where frequency-converted electric power is produced. The inverter outlet circuit breaker 65 is then turned on so that the frequency-converted electric power is supplied to the generator 3 through the generator outlet main circuit 70. Thus, the generator 3 is rotated at a given low speed. Once the difference between the rotational speed of the generator 3 and that of the air turbine 2 has become small, the shaft connector 28 is placed in the connecting position to connect the air turbine shaft to the generator shaft.

The inverter 64 gradually increases the frequency of the electric power from the frequency corresponding to the low speed, thereby increasing the rotational speed of the generator 3 used as an electric motor, that is, the rotational speed of the air turbine 2 and the compressor 1. Through the air turbine shaft connected to the generator shaft, the rotational speed of the compressor 1 is increased to feed compressed air to the solar collector 300. In other words, fossil fuel need not be burnt to generate combustion energy. Thus, no turbine startup auxiliary combustor is necessary, nor is a purge of the air turbine exhaust system at the time of startup. In addition, an air turbine startup electric motor is not necessary either.

While electric energy is fed from the electric system to the generator 3 to use the generator as an electric motor until the rated rotational speed is reached and air is fed to the solar collector 300, the output of the air turbine 2 increases as the amount and temperature of the high-temperature air from the solar collector 300 increases in response to a rise in the solar heat received. Thus, the operational mode of the generator 3 is gradually shifted from a power receiving mode (from the electric system to the generator 3) to a power supply mode (from the generator 3 to the electric system).

In this case, the in-plant electric system 500 turns off the inverter inlet circuit breaker 63, the inverter outlet circuit breaker 65, and the main circuit breaker 61 and turns on the inverter bypass circuit breaker 66. A synchronization test is then performed on the electric power generated by the generator 3 and the system electric power, and the main circuit breaker 61 is turned on, thereby continuing the power generation by reconnection to the system.

Figure 3A:
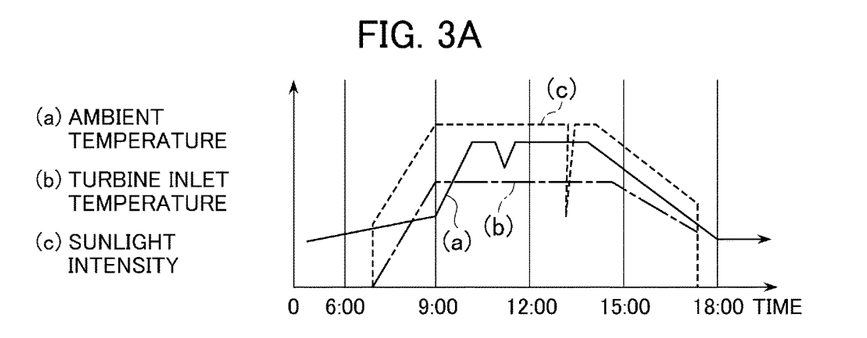
FIG. 3A is a graph illustrating changes in the ambient temperature, the turbine inlet high-temperature air temperature, and the intensity of sunlight to explain the operation of the solar/air turbine generator system in response to weather changes in a day.
Figure 3B:
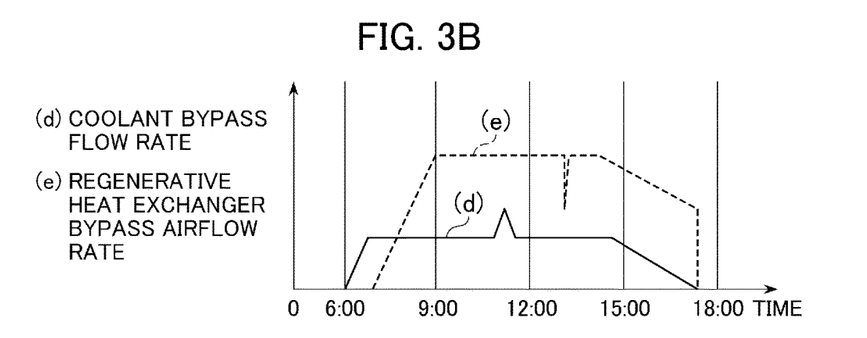
FIG. 3B is a graph illustrating changes in the coolant bypass flow rate and the regenerative heat exchanger bypass air flow rate to explain the operation of the solar/air turbine generator system in response to weather changes in a day.
Figure 3C:
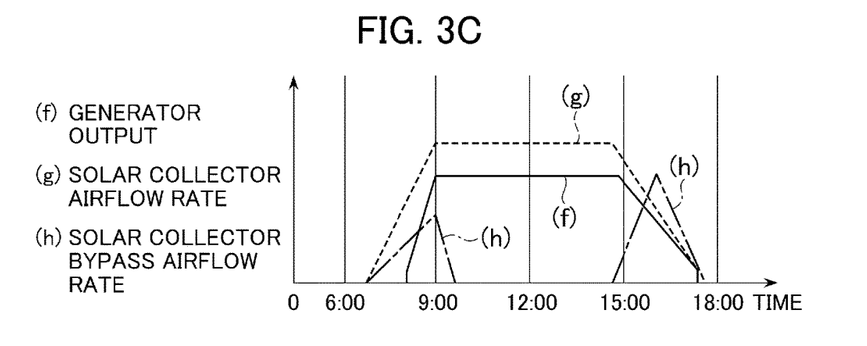
FIG. 3C is a graph illustrating changes in the generator output, the solar collector side air flow rate, and the solar collector bypass side air flow rate to explain the operation of the solar/air turbine generator system in response to weather changes in a day.

Next described with reference to FIGS. 3A to 3C is the operation of the solar/air turbine generator system of the invention in response to weather changes in a day. FIG. 3A is a graph illustrating changes in the ambient temperature, the turbine inlet high-temperature air temperature, and the intensity of sunlight. FIG. 3B is a graph illustrating changes in the coolant bypass flow rate and the regenerative heat exchanger bypass air flow rate. FIG. 3C is a graph illustrating changes in the generator output, the solar collector side air flow rate, and the solar collector bypass side air flow rate.

In FIGS. 3A to 3C, the horizontal axis represents time. In FIG. 3A, the solid curve (a) represents the ambient temperature, the chain curve (b) represents the turbine inlet air temperature, and the dashed curve (c) represents the intensity of sunlight. In FIG. 3B, the solid curve (d) represents the coolant bypass flow rate, and the dashed curve (e) represents the regenerative heat exchanger bypass air flow rate. In FIG. 3C, the solid curve (f) represents the output of the generator, the dashed curve (g) represents the solar collector side air flow rate, and the chain curve (h) represents the solar collector bypass side air flow rate.

FIGS. 3A to 3C show an example in which the generator output stays at a constant value without changes in the generator output and the air turbine inlet temperature even when the ambient temperature and the sunlight intensity change during the time period between the sunrise and sunset of a day.

The ambient temperature shown by the curve (a) of FIG. 3A starts to increase at 9 a.m. to reach its maximum, but drops once before noon. Thereafter, it reaches the maximum again. In this case, the coolant bypass flow rate shown by the curve (d) of FIG. 3B is increased from a normal value by the three-way coolant flow adjusting valve 7, which is controlled by the air cooler outlet air temperature controller 17 of the centrifugal chiller apparatus 400. This increases the air temperature at the outlet of the air cooler 4 and compensates for the drop in the ambient temperature. As a result, the system can be operated without changes in the turbine inlet air temperature shown by the curve (b) of FIG. 3A and the generator output shown by the curve (f) of FIG. 3C.

The sunlight intensity shown by the curve (c) of FIG. 3A starts to increase past 6 a.m. to reach its maximum at 9 a.m., but drops drastically past noon (e.g., by a cloud blocking the sunlight). Thereafter, it reaches the maximum again. In this case, the regenerative heat exchanger bypass air flow rate shown by the curve (e) of FIG. 3B is decreased drastically from a normal value by the regenerative heat exchanger bypass valve 35, which is controlled by the regenerative heat exchanger outlet air temperature controller 90 of the air turbine inlet temperature controller 200. This increases the air temperature at the outlet of the regenerative heat exchanger 45 and compensates for the drop in the sunlight intensity. As a result, the system can be operated without changes in the turbine inlet air temperature shown by the curve (b) of FIG. 3A and the generator output shown by the curve (f) of the FIG. 3C.

The solar collector bypass side air flow rate shown by the curve (h) and the solar collector side air flow rate shown by the curve (g) of FIG. 3C start to increase past 6 a.m. (after the startup of the air turbine 2) to reach their respective maximums at 9 a.m. at which the generator output shown by the curve (f) of FIG. 3C reaches its maximum (rated value). Thereafter, the solar collector bypass side air flow rate shown by the curve (h) of FIG. 3C gradually decreases by the three-way air distributing butterfly valve 38, which is controlled by the compressed air distribution controller 37 of the air turbine inlet temperature controller 200. The solar collector bypass side air flow rate shown by the curve (h) is eventually reduced to zero, which means that all of the air flows into the solar collector side, not into the solar collector bypass side. This is because the turbine inlet air temperature shown by the curve (b) of FIG. 3A is controlled by a program according to increases in the generator output.

The solar collector side air flow rate shown by the curve (g) of FIG. 3C, on the other hand, starts to decrease before 3 p.m. with the decrease in the generator output shown by the curve (f). While the generator output decreases, the solar collector bypass side air flow rate shown by the curve (h) of FIG. 3C gradually increases from zero to a certain value by the three-way air distributing butterfly valve 38, which is controlled by the compressed air distribution controller 37 of the air turbine inlet temperature controller 200. The solar collector bypass side air flow rate is then gradually reduced to zero. This, too, is because the turbine inlet air temperature shown by the curve (b) of FIG. 3A is controlled by a program according to decreases in the generator output.

In accordance with the solar/air turbine generator system of the foregoing embodiment, construction and power generating costs can be reduced, and the use of fossil fuel is not necessary.

Since the solar/air turbine generator system of the foregoing embodiment includes a control device that accommodates changes in the ambient temperature and sunlight intensity due to weather changes and controls the flow rate of compressed air in response to load request signals from the electric system, a stable operation can be achieved.

In accordance with the solar/air turbine generator system of the foregoing embodiment, fossil fuel is not required for power generation, nor is steam turbine generator equipment. Thus, the solar/air turbine generator system requires structurally simpler generator equipment and lower construction and power generating costs and is cost-effective.

In accordance with the solar/air turbine generator system of the foregoing embodiment, nitrogen oxide and carbon dioxide are not discharged into the atmosphere at all during startup, and stable electric power can be produced cost-effectively from solar heat regardless of weather changes.

In the solar/air turbine generator system of the foregoing embodiment, only the solar receiver 29 is installed atop the tower 30, and the rest of the equipment is installed on the ground. Thus, a smaller load is placed on the tower 30. This leads to the simplification of the tower 30 and its base; thus, construction costs can be reduced.

In the solar/air turbine generator system of the foregoing embodiment, the following procedure is conducted to start up the compressor 1 and the air turbine 2.

(1) Medium-pressure, high-temperature air is sealed in the piping of the solar collector at night.

(2) On the next day, the sealed high-temperature air is introduced into the air turbine 2 to rotate it at a low speed.

(3) The inverter 64 is used to drive the generator 3 as an electric motor. Once the rotational speed of the generator 3 gets closer to that of the air turbine 2, the shaft connector 28 connects the air turbine shaft and the generator shaft.

(4) The frequency is increased by the inverter 64 to achieve the rated rotational speed.

Because of the above procedure, the power supply needed to rotate the compressor 1 and the air turbine 2 from complete halt status is not necessary. As a result, the in-plant electric power is consumed less during the startup.

The invention is not limited to the foregoing embodiment but allows various modifications. The foregoing embodiment is only meant to be illustrative, and the invention is not limited to the specific form disclosed.

DESCRIPTION OF THE REFERENCE NUMERALS

1: Compressor
2: Air turbine
3: Generator
4: Air cooler
5: Coolant circulating pump
6: Centrifugal chiller
7: Three-way coolant flow adjusting valve
16: Temperature sensor (air cooler outlet air temperature)
17: Air cooler outlet air temperature controller
18: Temperature sensor (air turbine inlet air temperature)
19: Temperature sensor (solar collector outlet air temperature)
20: Temperature sensor (solar collector bypass air temperature)
21: Temperature sensor (air turbine outlet air temperature)
22: Temperature sensor (compressor outlet air temperature)
23: Temperature sensor (regenerative heat exchanger outlet air temperature)
24: Temperature sensor (air cooler inlet air temperature)
25: Pressure sensor (solar collector outlet air pressure)
26: Air pressure relief controller
27: Air pressure relief adjustment valve
28: Shaft connector
29: Solar receiver
30: Tower
32: Solar reflector
33: Sunlight
34: Reflected light
35: Regenerative heat exchanger bypass valve
36: Deviation calculator
37: Compressed air distribution controller
38: Three-way air distributing butterfly valve
39: Pyrheliometer
43: Compressor inlet butterfly valve
45: Regenerative heat exchanger
47: Solar collector inlet butterfly valve
52: Solar collector outlet butterfly valve
60: System circuit breaker
61: Main circuit breaker
62: Main transformer
64: Inverter
67: In-plant transformer circuit breaker
68: In-plant transformer high voltage side circuit
69: In-plant transformer
70: Generator outlet main circuit
71: Main transformer low voltage side circuit
75: External system
80: In-plant auxiliary circuit
90: Regenerative heat exchanger outlet air temperature controller
91: Solar collection controller

What is claimed is:

1. A solar/air turbine generator system comprising:
a compressor for drawing in and compressing air;
a solar receiver for heating the air compressed by the compressor with the use of solar heat collected by a solar collector;
an air turbine for driving the compressor and a generator by receiving the compressed air heated by the solar receiver;
a regenerative heat exchanger, located downstream of the compressor and upstream of the solar receiver, for heating the air compressed by the compressor using the exhaust of the air turbine as a heating medium;
a distribution device, located downstream of the compressor and upstream of the regenerative heat exchanger, for distributing the air compressed by the compressor to the side of the regenerative heat exchanger and to a bypass side, the bypass side being the inlet side of the air turbine;
an air cooler for cooling the air drawn in by the compressor;
a coolant circulating pump for circulating cooling water to the air cooler;
a centrifugal chiller for cooling the cooling water;
an adjusting valve for controlling a flow rate of the cooling water flowing to the air cooler;
an air cooler outlet air temperature controller for controlling an opening degree of the adjusting valve;
a first temperature sensor for detecting an air temperature at an inlet of the air turbine;

a second temperature sensor for detecting an air temperature at an outlet of the air cooler; and a third temperature sensor for detecting ambient temperature, wherein the solar/air turbine generator system further includes a control device for maintaining the air temperature at the inlet of the air turbine at a constant value by adjusting the flow rate of the air turbine exhaust that flows into the regenerative heat exchanger as a heating medium, and wherein the air cooler outlet air temperature controller reads the air turbine inlet air temperature detected by the first temperature sensor, the air cooler outlet air temperature detected by the second temperature sensor, and the ambient temperature detected by the third temperature sensor to control the air cooler outlet air temperature such that the air turbine inlet air temperature is maintained at a constant value.

2. The solar/air turbine generator system of claim 1, further comprising:

a regenerative heat exchanger inflow system for directing the exhaust of the air turbine to the regenerative heat exchanger;

a regenerative heat exchanger bypass system for causing the exhaust of the air turbine to bypass the regenerative heat exchanger; and a flowrate adjusting valve for adjusting the flow rate of the exhaust flowing into the regenerative heat exchanger bypass system, wherein the control device controls the opening degree of the flowrate adjusting valve.

3. The solar/air turbine generator system of claim 1, wherein the distribution device includes:

a three-way air flow rate switch valve for distributing the air compressed by the compressor to the side of the regenerative heat exchanger and to the bypass side, the bypass side being the inlet side of the air turbine; and a distribution controller for controlling the opening degree of the three-way air flow rate switch valve, and wherein the distribution controller reads the air turbine inlet air temperature detected by the first temperature sensor and the output of the generator to control the opening degree of the three-way air flow rate switch valve so that the air turbine inlet air temperature is program-controlled.

4. The solar/air turbine generator system of claim 3, further comprising:

a solar collector including the solar receiver installed atop a tower and the solar receiver having a reflecting device;

a solar collection controller for controlling the reflection position of the reflection device of the solar collector;

a fourth temperature sensor for detecting the air temperature at the outlet of the solar collector; and a fifth temperature sensor for detecting the air temperature of the bypass side, the bypass side being the inlet side of the air turbine, wherein the solar collection controller reads the air turbine inlet air temperature detected by the first temperature, the solar collector outlet air temperature detected by the fourth temperature sensor, and the bypass side air temperature detected by the fifth temperature sensor to control the reflection position of the reflection device so that the heat amount to be introduced into the air turbine is increased or decreased.

5. The solar/air turbine generator system of claim 3, further comprising:

an inverter, provided in an in-plant electric system, for converting the electric power from the in-plant electric system into variable frequency power and supplying the converted power to the generator so that the generator is used as an electric motor to drive the air turbine;

a solar collector inlet butterfly valve provided on the inlet side of the solar collector; and a solar collector outlet butterfly valve provided on the outlet side of the solar collector, wherein the high-temperature air sealed in the piping of the solar collector by closing the solar collector inlet butterfly valve and the solar collector outlet butterfly valve after the end of operation on a previous day is introduced into the air turbine to rotate it at a low speed, and wherein power with a particular frequency obtained by the inverter is then supplied to the generator to drive it as an electric motor.

6. The solar/air turbine generator system of claim 4, further comprising:

a pressure relief adjusting valve one end of which is connected to the outlet side of the solar collector and the other end of which is open to atmosphere;

a pressure relief controller for controlling the opening degree of the pressure relief adjusting valve; and a pressure sensor for detecting the air pressure at the outlet of the solar collector, wherein the pressure relief controller reads the solar collector outlet air pressure detected by the pressure sensor to discharge the air to atmosphere by opening the pressure relief adjusting valve when the air pressure becomes larger than a predetermined value.

* * * * *